US009994081B2

(12) United States Patent  
Becker

(10) Patent No.: US 9,994,081 B2  
(45) Date of Patent: Jun. 12, 2018

(54) DEVICE FOR CONTROLLING THE PRESSURE IN A VEHICLE TYRE

(71) Applicant: PressureRite (Pty) Ltd., Cape Town (ZA)

(72) Inventor: Pierre Van Wyk Becker, Cape Town (ZA)

(73) Assignee: PressureRite (Pty) Ltd., Cape Town (ZA)

( * ) Notice: Subject to any disclaimer, the term of this patent is extended or adjusted under 35 U.S.C. 154(b) by 0 days. days.

(21) Appl. No.: 15/038,462

(22) PCT Filed: Nov. 20, 2014

(86) PCT No.: PCT/IB2014/066185  
§ 371 (c)(1),  
(2) Date: May 22, 2016

(87) PCT Pub. No.: WO2015/075655  
PCT Pub. Date: May 28, 2015

(65) Prior Publication Data  
US 2016/0288591 A1   Oct. 6, 2016

(30) Foreign Application Priority Data

Nov. 22, 2013  (ZA) ................................ 2013/08791

(51) Int. Cl.  
*B60C 23/00* (2006.01)  
*B60C 23/12* (2006.01)  
(Continued)

(52) U.S. Cl.  
CPC .......... *B60C 23/004* (2013.01); *B60C 23/007* (2013.01); *B60C 23/12* (2013.01); *F04B 35/04* (2013.01); *F04B 37/10* (2013.01)

(58) Field of Classification Search  
CPC ..... B60C 23/004; B60C 23/007; B60C 23/12; F04B 35/04; F04B 37/10  
See application file for complete search history.

(56) References Cited

U.S. PATENT DOCUMENTS 2,506,677 A   5/1950  McKenna  
8,435,012 B2 *  5/2013  Clinciu .................. F04B 35/01  
                                         152/418

(Continued)

FOREIGN PATENT DOCUMENTS

WO   WO 2015/075655   5/2015

OTHER PUBLICATIONS

International Search Report and the Written Opinion dated Feb. 11, 2015 From the International Searching Authority Re. Application No. PCT/IB2014/066185.

*Primary Examiner* — Kip T Kotter

(57) ABSTRACT

A device (10) is disclosed for providing air to a tire which is mounted on a wheel rim which itself is free to rotate about a fixed, that is, non-rotatable axle 22. The device includes a pump (50, 52, 54, 62) which in use rotates with the tire and which is configured to provide, when activated, air under pressure to the tire. There is a pump drive system for activating the pump. The pump drive system comprising a piston rod (56) which is connected to and rotates with the tire and a body (40) which rotates in unison with the rod (56) while the pump is inactive. An electric motor (68) rotates the body (40) with respect to the rod (56) to activate the pump and provide air to the tire. Rotation of the body (40) is superimposed on rotation of the pump with the tire. The device also includes a stator component (26) and coils (30) and magnets (32) for generating, by electrical induction, power for driving the motor using the relative rotation between the second part and the stator component (26).

8 Claims, 2 Drawing Sheets

(51) Int. Cl.
*F04B 37/10* (2006.01)
*F04B 35/04* (2006.01)

(56) References Cited

U.S. PATENT DOCUMENTS

| | | | |
|---|---|---|---|
| 2004/0130442 A1* | 7/2004 | Breed | B60C 11/24 340/443 |
| 2004/0194845 A1* | 10/2004 | Du Toit | B60C 23/12 141/38 |
| 2006/0102268 A1* | 5/2006 | Loewe | B60C 23/004 152/415 |
| 2007/0151648 A1* | 7/2007 | Loewe | B60C 23/004 152/419 |
| 2009/0188310 A1* | 7/2009 | Mancosu | B60C 23/041 73/146.3 |
| 2014/0271261 A1* | 9/2014 | Boelryk | F04B 27/0404 417/233 |
| 2015/0013866 A1* | 1/2015 | Tanno | B60B 1/12 152/417 |
| 2015/0191058 A1* | 7/2015 | van Wyk Becker | B60C 23/0408 152/419 |
| 2015/0239309 A1* | 8/2015 | Root | B60C 23/041 152/419 |
| 2016/0263949 A1* | 9/2016 | Miu | B60C 23/12 |

* cited by examiner

DEVICE FOR CONTROLLING THE PRESSURE IN A VEHICLE TYRE

RELATED APPLICATIONS

This application is a National Phase of PCT Patent Application No. PCT/IB2014/066185 having International filing date of Nov. 20, 2014, which claims the benefit of priority of South African Patent Application No. 2013/08791 filed on Nov. 22, 2013. The contents of the above applications are all incorporated by reference as if fully set forth herein in their entirety.

FIELD AND BACKGROUND OF THE INVENTION

This invention relates to self-contained devices for maintaining pressure in rotating vehicle tyres.

Devices for maintaining vehicle tyre pressure are disclosed in U.S. Pat. No. 7,013,931 and PCT/IB2013/054732 (published as WO2014/009822). The devices are attached to vehicle wheels and each includes a hanging, stationary counterweight, while the remainder of the device normally rotates with the wheel. When a tyre on the vehicle wheel loses pressure, a part of the device becomes connected to the counterweight, so that it becomes stationary. Relative motion between the part that is stationary and the remainder of the device is used to drive a pump that pressurises the tyre to the desired pressure.

The present invention seeks to provide a simple and cost-effective improvement on such prior devices.

SUMMARY OF THE INVENTION

According to the present invention there is provided a device for providing air to a tyre which is mounted on a wheel rim which itself is free to rotate about a fixed, that is, non-rotatable axle, the device comprising:
a) a pump which in use rotates with the tyre and which is configured to provide, when activated, air under pressure to the tyre;
b) a pump drive system for activating the pump, the pump drive system comprising a first part which is connected to and rotates with the tyre and a second part which rotates in unison with the first part whilst the pump is inactive, rotation of the second part being superimposed on rotation of the parts with the tyre;
c) an electric motor for rotating said second part with respect to the first part to activate the pump and provide air to the tyre;
d) a stator component; and
e) means for generating, by electrical induction, power for driving said motor using the relative rotation between said second part and the stator component.

Said stator component is preferably configured to be attached to said fixed axle and the second part can include a component which rotates with the tyre, there being coils and magnets carried by said components for generating electrical power for driving said motor.

In this form a first of said components carries a plurality of magnets arranged in a circular array, and the a second of the components carries a plurality of coils arranged in a circular array the diameter of which circle is the same as the diameter of the circle around which the array of magnets are arranged. The device can further include a battery pack for storing power generated by inductive interaction between the coils and the magnets.

There can be a drive pulley fixed to the motor's output shaft, a driven pulley fast in rotation with said second part, and a drive element entrained around said pulleys for rotating said driven pulley and said second part relative to the first part when the motor is activated.

BRIEF DESCRIPTION OF THE SEVERAL VIEWS OF THE DRAWINGS

For a better understanding of the present invention, and to show how the same may be carried into effect, the invention will now be described by way of non-limiting example, with reference to the accompanying drawings in which.

DESCRIPTION OF SPECIFIC EMBODIMENTS OF THE INVENTION

Figure 1:
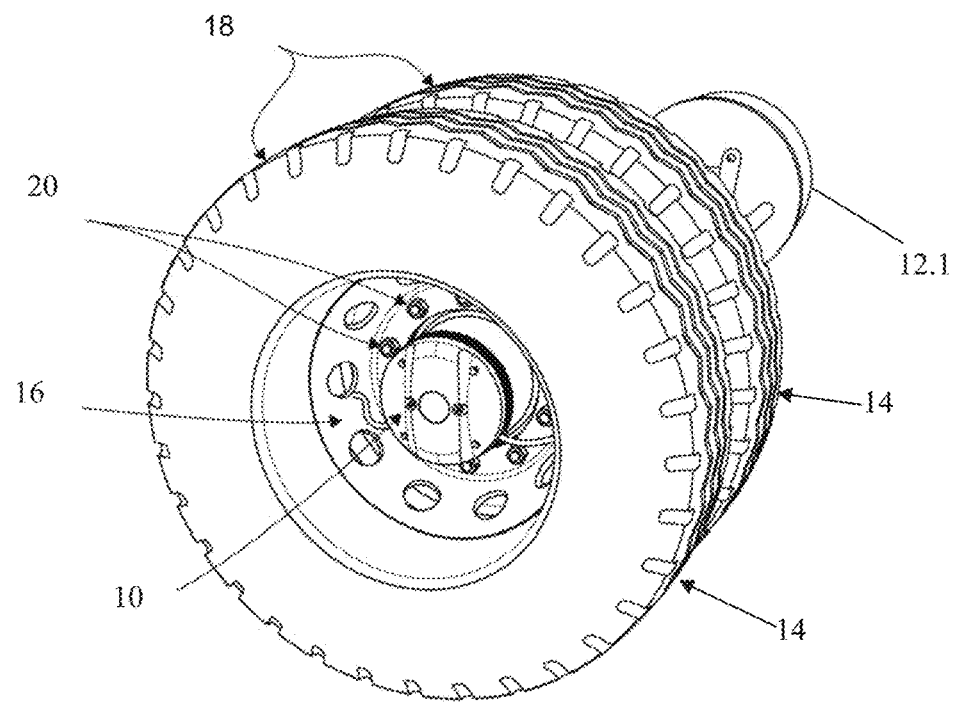
FIG. 1 is a perspective view of a pair of vehicle wheels, with a device according to the present invention fitted on a hub of the wheels.

Referring to the drawings, a device according to the present invention is generally indicated by reference numeral 10 and is shown in its "in use" position in which it provides fluid in the form of compressed air to a rotating element in the form of a pneumatic tyre.

The device 10 is integrated into the hub 12 of a pair of wheels. Each wheel comprises a rim 16 with a pneumatic tyre 18 on it, the rims 16 being attached to the hub 12 by wheel nuts 20. In the illustrated example, the wheels are not driven e.g. they are for a heavy vehicle trailer. In FIG. 1, another hub 12.1 is shown which shares a common stationary hollow axle 22 (FIGS. 2 and 3) with the hub 12.

Figure 3:
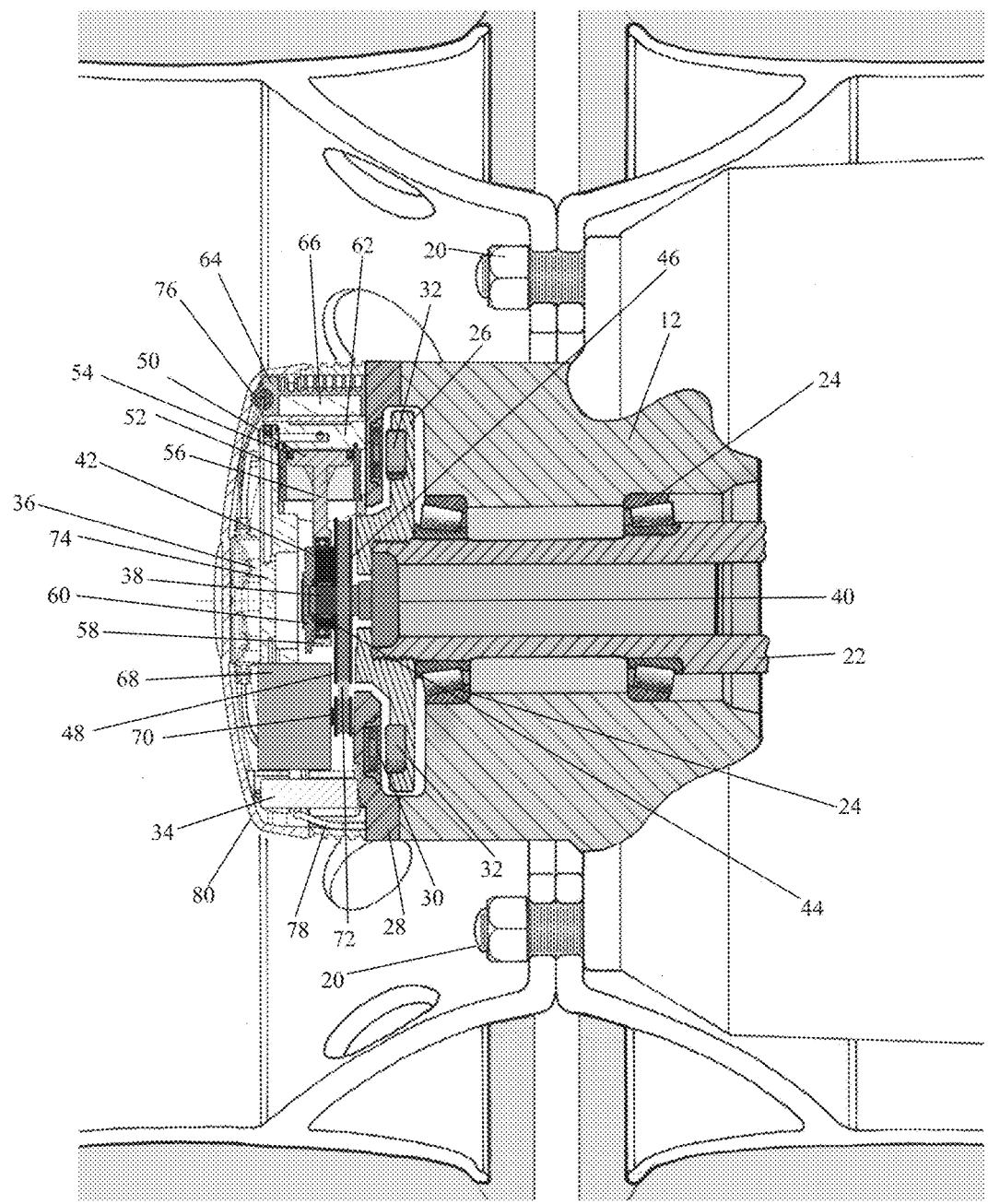
FIG. 3 is a sectional view of the device of FIGS. 1 and 2 to a larger scale.

Referring now to FIG. 3, the hub 12 is rotationally supported on the stationary hollow axle 22 by a pair of wheel bearings 24. The end of the axle 22 is threaded and a stator 26 is attached to its screw thread, thereby retaining the hub 12 and the wheel bearings 24 in place on the axle 22. In preferred embodiments, the stator 26 is also attached to the axle 22 using additional attachment means to keep it secure and to ensure correct axial orientation, etc. By virtue of its attachment to the axle 22, the stator 26 does not rotate with the hub 12 and is thus a stationary object.

A main plate 28 is attached to the hub 12, adjacent the outer circumference of the stator 26 and a plurality of alternator coils 30 are carried by the main plate. The coils are in a circular array on the same radius as a plurality of alternator magnets 32 that are carried by the stator 26. It is possible for the coils to be carried by the stator 26 and the magnets by the main plate 28. When the hub 12 and wheels 14 rotate, the main plate 28 rotates with them and movement of the alternator coils 30 in close proximity to the magnets 32 induces current in the coils, which is used to charge a battery pack 34 and provide power to electronics 36 of the device 10. The main plate 28 has a central aperture through which a part of the stator 26 extends.

Figure 2:
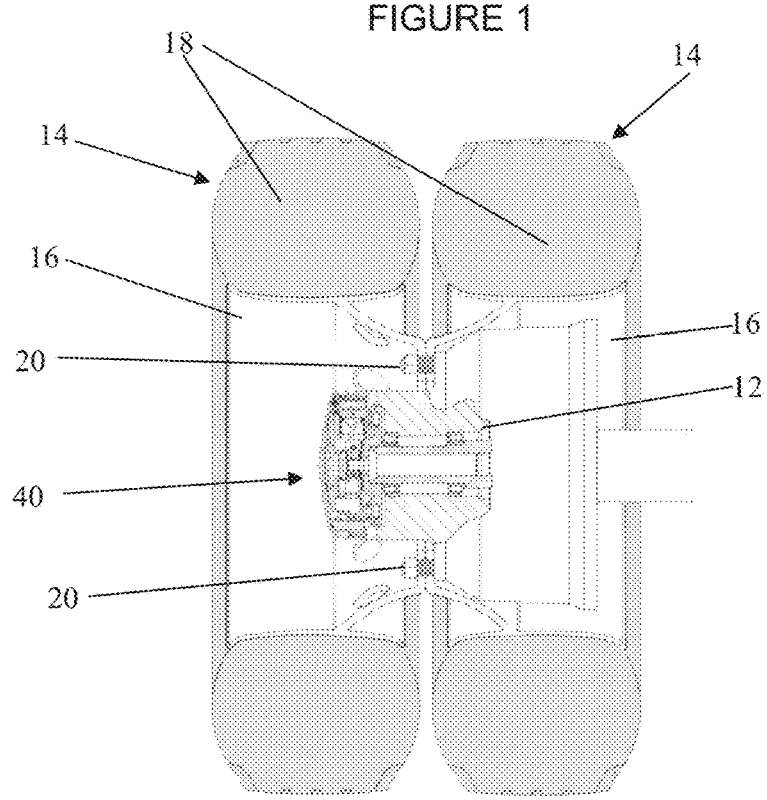
FIG. 2 is a sectional view of the pair of wheels and the device of FIG. 1.

A pump axle 38 is located at the end of the axle 22 and a head 40 of the pump axle 38 is held in position in a recess at the end of the axle 22 by the stator 26. The pump axle 38 extends outwards relative to the wheels i.e. to the left as shown in FIGS. 2 and 3 from the stator 26 and remains stationary, with the axle 22 and the stator 26. An eccentric body 42 is supported on the pump axle 38 to rotate about the pump axle 38 on roller bearings 44. The body 42 incorporates a pump pulley 46 having a circumferential groove 48.

The device 10 further includes a pump piston 50 that can reciprocate in a pump cylinder sleeve 52 with a pump piston seal 54 sealing between the pump piston 50 and the sleeve 52. The piston 50 is connected to the eccentric body 42 by a connecting rod 56, running on a big end bearing 58 that is held in place by an eccentric bearing plate 60. A compression chamber is formed between the piston 50, sleeve 52 and a cylinder head 62 that includes an air filter 64 with a foam filter element 66. The piston 50, cylinder sleeve 52, seal 54, cylinder head 62, etc. form a pump that is configured to provide compressed air to the tyres 18. The connecting rod 56 of the pump piston 50 forms a first part of a pump drive system and the eccentric body 42 forms a second part of the pump drive system. The pump drive system is configured to activate the pump when pressure in a tyre 18 drops below a predetermined threshold, as will be described below.

An electric motor 68 is provided there being a drive pulley 70 on the motor's shaft. A belt 72 extends around the drive pulley 70 and the pump pulley 46 to transfer power from the motor 68 to the body 42.

A pressure manifold 74 defines a number of flow passages, connectors, etc. Three solenoid operated pneumatic valves (not shown) are provided which are controlled by the electronics 36. The operation of the pressure manifold 74 is substantially as described in more detail in PCT/IB2013/054732 as will be evident from its functional description below. Suffice it to say that it defines a cavity and connects two tyre pressure hoses (from the two tyres 18), the solenoid valves, two Schrader inflation valves and a pressure port from the compression chamber of the pump to a common cavity within the manifold.

Some of the ancillary features that are shown in FIG. 3 include an antenna 76 which allows the electronics 36 to communicate with external devices (e.g. with the vehicle's on-board computer); and wheel temperature and rotational speed sensors 78. Rotational speed is determined through a Hall effect sensor that senses rotation of a magnet attached to the stator 26. The parts of the device 10 on the outside of the main plate 28 (apart from the Schrader inflation valves) are protected by a cover 80.

In use, the entire device 10 normally rotates with the wheel hub 12, apart from the stator 26 and the pump axle 38. The eccentric body 42 and the main plate 28 also rotate with the hub 12.

When tyre pressure in a tyre 18 drops below a predetermined pressure, direct current from the battery pack 34 is supplied to the motor 68, which drives the eccentric body 42 via the belt 72 and pulleys 46, 72 so that it rotates around the pump axle. The rotation is relative to the already rotating wheel hub 12. The relative rotation between the big end of the connecting rod 56 and the eccentric body 42 causes the connecting rod 56 and pump piston 50 to reciprocate within the pump's cylinder sleeve 52. The pump is thus activated by the relative rotation of the eccentric body 42 and supplies compressed air that is directed via the pressure manifold 74 to the tyre 18.

When the tyre pressure reaches a predetermined level, the tyre is disconnected from the pump and current to the motor 68 ceases, so that the eccentric body 40 is again held against rotation relative to the wheel hub 12 by the pressure in the cylinder of the pump and the device 10 is returned to its normal, inactive state.

What is claimed is:

1. A device for providing air to a tyre which is mounted on a wheel rim which is free to rotate about a non-rotatable axle, the device comprising:—
    a) a pump which in use rotates with the tyre and which is configured to provide, when activated, air under pressure to the tyre;
    b) a pump drive system for activating the pump, the pump drive system comprising a first part which is connected to and rotates with the tyre and a second part which rotates in unison with the first part whilst the pump is inactive;
    c) an electric motor for rotating said second part with respect to the first part to activate the pump and provide air to the tyre;
    d) a stator component; and
    a plurality of alternator magnets and a plurality of coils for generating, by electrical induction, power for driving said motor, the power is generated by a relative rotation between the plurality of alternator magnets and the plurality of coils;
    wherein the plurality of alternator magnets or the plurality of coils rotate with said first part and the other of the plurality of alternator magnets and the plurality of coils are carried by the stator component.

2. The device as claimed in claim 1, wherein said stator component is configured to be attached to said fixed axle and the second part includes a component which rotates with the tyre.

3. The device as claimed in claim 2, wherein a first of said components carries the plurality of magnets, and a second of the components carries the plurality of coils;
    wherein the plurality of magnets are arranged in a first circular array and the plurality of coils are arranged in a second circular array;
    wherein the diameter of the first and second circular arrays is the same.

4. The device as claimed in claim 3, further comprising a battery pack for storing power generated by inductive interaction between the coils and the magnets.

5. The device as claimed in claim 4, further comprising:
    a drive pulley fixed to an output shaft of the motor,
    a driven pulley fixed to said second part and rotates therewith, and
    a drive element entrained around said pulleys for rotating said driven pulley and said second part relative to the first part when the motor is activated.

6. The device as claimed in claim 2, further comprising:
    a drive pulley fixed to an output shaft of the motor,
    a driven pulley fixed to said second part and rotates therewith, and
    a drive element entrained around said pulleys for rotating said driven pulley and said second part relative to the first part when the motor is activated.

7. The device as claimed in claim 3, further comprising:
    a drive pulley fixed to an output shaft of the motor,
    a driven pulley fixed to said second part and rotates therewith, and
    a drive element entrained around said pulleys for rotating said driven pulley and said second part relative to the first part when the motor is activated.

8. The device as claimed in claim 1, further comprising:
    a drive pulley fixed to an output shaft of the motor,
    a driven pulley fixed to said second part and rotates therewith, and a drive element entrained around said pulleys for rotating said driven pulley and said second part relative to the first part when the motor is activated.

\* \* \* \* \*